US010008207B2

(12) United States Patent
Foerster et al.

(10) Patent No.: US 10,008,207 B2
(45) Date of Patent: *Jun. 26, 2018

(54) MULTI-STAGE HOTWORD DETECTION (71) Applicant: Google LLC, Mountain View, CA (US)

(72) Inventors: Jakob Nicolaus Foerster, Oxford (GB); Alexander H. Gruenstein, Mountain View, CA (US); Diego Melendo Casado, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/233,090

(22) Filed: Aug. 10, 2016

(65) Prior Publication Data

US 2016/0351199 A1 Dec. 1, 2016

Related U.S. Application Data (63) Continuation of application No. 14/657,588, filed on Mar. 13, 2015, now Pat. No. 9,418,656.

(Continued)

(51) Int. Cl.
*G10L 15/16* (2006.01)
*G10L 17/10* (2013.01)
(Continued)

(52) U.S. Cl.
CPC ............ *G10L 17/10* (2013.01); *G10L 15/16* (2013.01); *G10L 15/20* (2013.01); *G10L 15/22* (2013.01);
(Continued)

(58) Field of Classification Search
CPC ....... G10L 15/00; G10L 15/063; G10L 15/08; G10L 15/1815; G10L 15/10; G10L 15/12;
(Continued)

(56) References Cited

U.S. PATENT DOCUMENTS 4,941,178 A 7/1990 Chuang
7,529,665 B2 5/2009 Kim
(Continued)

FOREIGN PATENT DOCUMENTS

EP 1091347 4/2001

OTHER PUBLICATIONS

Broder, Andrei Z. et al., "Efficient Query Evaluation using a Two-Level Retrieval Process", Proceedings of the 12th International Conference on Information and Knowledge Management, CIKM 2003, 9 pages.

(Continued)

*Primary Examiner* — Vu B Hang
(74) *Attorney, Agent, or Firm* — Fish & Richardson P.C.

(57) ABSTRACT

Methods, systems, and apparatus, including computer programs encoded on a computer storage medium, for multi-stage hotword detection are disclosed. In one aspect, a method includes the actions of receiving, by a second stage hotword detector of a multi-stage hotword detection system that includes at least a first stage hotword detector and the second stage hotword detector, audio data that corresponds to an initial portion of an utterance. The actions further include determining a likelihood that the initial portion of the utterance includes a hotword. The actions further include determining that the likelihood that the initial portion of the utterance includes the hotword satisfies a threshold. The actions further include, in response to determining that the likelihood satisfies the threshold, transmitting a request for the first stage hotword detector to cease providing additional audio data that corresponds to one or more subsequent portions of the utterance.

20 Claims, 4 Drawing Sheets

Related U.S. Application Data (60) Provisional application No. 62/072,085, filed on Oct. 29, 2014.

(51) Int. Cl.
*G10L 15/20* (2006.01)
*G10L 15/22* (2006.01)
*G10L 17/02* (2013.01)
*G10L 17/18* (2013.01)
*G10L 17/24* (2013.01)
G10L 15/08 (2006.01)
G10L 25/30 (2013.01)
G10L 15/12 (2006.01)
G10L 17/00 (2013.01)

(52) U.S. Cl.
CPC ............. *G10L 17/02* (2013.01); *G10L 17/18* (2013.01); *G10L 17/24* (2013.01); *G10L 15/12* (2013.01); *G10L 17/00* (2013.01); *G10L 25/30* (2013.01); *G10L 2015/088* (2013.01); *G10L 2015/223* (2013.01)

(58) Field of Classification Search
CPC ......... G10L 15/16; G10L 15/22; G10L 15/30; G10L 15/265; G10L 25/30
USPC .......................... 704/232, 238, 239, 230, 251
See application file for complete search history.

(56) References Cited

U.S. PATENT DOCUMENTS

| | | |
|---|---|---|
| 8,762,142 B2 | 6/2014 | Jeong |
| 9,418,656 B2 * | 8/2016 | Foerster .................. G10L 15/20 |
| 2008/0189106 A1 | 8/2008 | Low |
| 2013/0080171 A1 * | 3/2013 | Mozer ..................... G10L 15/22 |
| | | 704/251 |
| 2014/0195247 A1 | 7/2014 | Parkinson |
| 2016/0125877 A1 | 5/2016 | Foerster et al. |

OTHER PUBLICATIONS

Nguyen, Hanh H., et al., "Multiple neural networks for a long term time series forecast", Journal of Neural Computing and Applications, vol. 13, issue 1, Apr. 2004, 9 pages.

Sarcia, Salvatore A. et al., "Auto-associative Neural Networks to Improve the Accuracy of Estimation Models", *Artificial Intelligence Applications for Improved Software Engineering Development: New Prospects*, Eds. Mezlane, Farid and Vadera, Sunil, 2010,18 pages.

* cited by examiner

MULTI-STAGE HOTWORD DETECTION

CROSS REFERENCE TO RELATED APPLICATIONS

This application is a continuation of U.S. application Ser. No. 14/657,588, filed Mar. 13, 2015, which claims the benefit of U.S. Patent Application No. 62/072,085, filed Oct. 29, 2014, the contents of both are incorporated by reference.

TECHNICAL FIELD

This specification generally relates to speech recognition and speaker identification.

BACKGROUND

The reality of a speech-enabled home or other environment—that is, one in which a user need only speak a query or command out loud and a computer-based system will field and answer the query and/or cause the command to be performed—is upon us. A speech-enabled environment (e.g., home, workplace, school, etc.) can be implemented using a network of connected microphone devices distributed throughout the various rooms or areas of the environment. Through such a network of microphones, a user has the power to orally query the system from essentially anywhere in the environment without the need to have a computer or other device in front of him/her or even nearby. For example, while cooking in the kitchen, a user might ask the system "how many milliliters in three cups?" and, in response, receive an answer from the system, e.g., in the form of synthesized voice output. Alternatively, a user might ask the system questions such as "when does my nearest gas station close," or, upon preparing to leave the house, "should I wear a coat today?"

Further, a user may ask a query of the system, and/or issue a command, that relates to the user's personal information. For example, a user might ask the system "when is my meeting with John?" or command the system "remind me to call John when I get back home."

SUMMARY

For a speech-enabled system, the users' manner of interacting with the system is designed to be primarily, if not exclusively, by means of voice input. Consequently, the system, which potentially picks up all utterances made in the surrounding environment including those not directed to the system, must have some way of discerning when any given utterance is directed at the system as opposed, e.g., to being directed an individual present in the environment. One way to accomplish this is to use a hotword, which by agreement among the users in the environment, is reserved as a predetermined word that is spoken to invoke the attention of the system. In an example environment, the hotword used to invoke the system's attention are the words "OK computer." Consequently, each time the words "OK computer" are spoken, it is picked up by a microphone, conveyed to the system, which performs speech recognition techniques to determine whether the hotword was spoken and, if so, awaits an ensuing command or query. Accordingly, utterances directed at the system take the general form [HOTWORD] [QUERY], where "HOTWORD" in this example is "OK computer" and "QUERY" can be any question, command, declaration, or other request that can be speech recognized, parsed and acted on by the system, either alone or in conjunction with the server via the network.

According to one innovative aspect of the subject matter described in this specification, a user device verifies that an utterance includes a hotword, such as "Ok computer" by using a two stage process. The first stage, which may be referred to as a "coarse" stage is implemented in a digital signal processor (DSP). The first stage processes the utterance and computes a likelihood that the utterance includes a hotword. The first stage provides a rough approximation that the utterance includes a hotword. For example, if the user device receives the sound of a dog barking, then the first stage would likely not determine that the dog bark includes "ok computer," and processing would end. If the user device receives the sound of a person saying, "Hey Scooter," then the first stage would likely determine that "hey" is close enough to the beginning of "ok computer" and processing would continue.

When the user device is determining whether a hotword is being uttered, the first stage may not need to receive and process all of the utterance in order to determine that the utterance is likely the hotword. For example, the first stage may only receive the first few audio frames associated with an utterance before triggering. Once the first stage triggers, the first stage may provide, to a second stage, the initial portion of the utterance and subsequent portions of the utterance as the user device receives the subsequent portions. The second stage, which may be referred to as a "fine" stage, may be implemented in software. The second stage computes, with greater accuracy than the first stage, a likelihood that the utterance includes a hotword. The second stage processes the initial portion of the utterance and subsequent portions as the second stage receives them. Once the second stage computes a likelihood that the utterance includes a hotword that is either above an upper threshold or below a lower threshold, the second stage provides a signal to the first stage to stop providing to the second stage with subsequent portions of the utterance. Using the utterance "Hey Scooter" as an example, first stage may trigger based on the word "hey," but may continue providing audio data to the second stage. The second stage may not determine until "hey scoot" is received that the utterance does not include a hotword. Once that determination is made, the second stage may instruct the first stage to stop providing subsequent portions of the utterance.

In general, another innovative aspect of the subject matter described in this specification may be embodied in methods that include the actions of receiving, by a second stage hotword detector of a multi-stage hotword detection system that includes at least a first stage hotword detector and the second stage hotword detector, audio data that corresponds to an initial portion of an utterance; determining, by the second stage hotword detector, a likelihood that the initial portion of the utterance includes a hotword; determining, by the second stage hotword detector, that the likelihood that the initial portion of the utterance includes the hotword satisfies a threshold; and in response to determining that the likelihood satisfies the threshold, transmitting, by the second stage hotword detector and to the first stage hotword detector, a request for the first stage hotword detector to cease providing additional audio data that corresponds to one or more subsequent portions of the utterance.

These and other embodiments can each optionally include one or more of the following features. The first stage hotword detector is implemented in a digital signal processor and the second stage hotword detector is implemented in software. The actions further include providing, by the second stage hotword detector, the audio data to a speaker identifier. The action of receiving, by a second stage hotword detector of a multi-stage hotword detection system that includes at least a first stage hotword detector and the second stage hotword detector, audio data that corresponds to an initial portion of an utterance further includes accessing, by the second stage hotword detector, the audio data from a particular memory location, where the first stage hotword detector stored the audio data in the particular memory location. The first stage hotword detector is based on a neural network and includes a first number of nodes and a second number of hidden layers. The second stage hotword detector is based on the neural network and includes a third number of nodes and a fourth number of hidden layers, the third number being greater than the first number and the fourth number being greater than the second number.

The first stage hotword detector is speaker and language independent and the second stage hotword detector is speaker and language dependent. The audio data that corresponds to the initial portion of an utterance includes audio data that was received before the initial portion of the utterance. The actions further include receiving, by the second stage hotword detector, data indicating that the first stage hotword detector determined an initial likelihood that the initial portion of the utterance included the hotword, where the initial likelihood satisfied an initial threshold. The action of transmitting, by the second stage hotword detector and to the first stage hotword detector, a request for the first stage hotword detector to cease providing additional audio data that corresponds to one or more subsequent portions of the utterance further includes transmitting, by the second stage hotword detector and to the first stage hotword detector, the request for the first stage hotword detector to cease providing, to a memory for consumption by the second stage hotword detector or directly to the second stage hotword detector, the additional audio data that corresponds to the one or more subsequent portions of the utterance.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. The first stage uses little power and can filter out many utterances and sounds that are not similar to hotwords without triggering the higher power second stage. The second stage can be updated though a software update.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
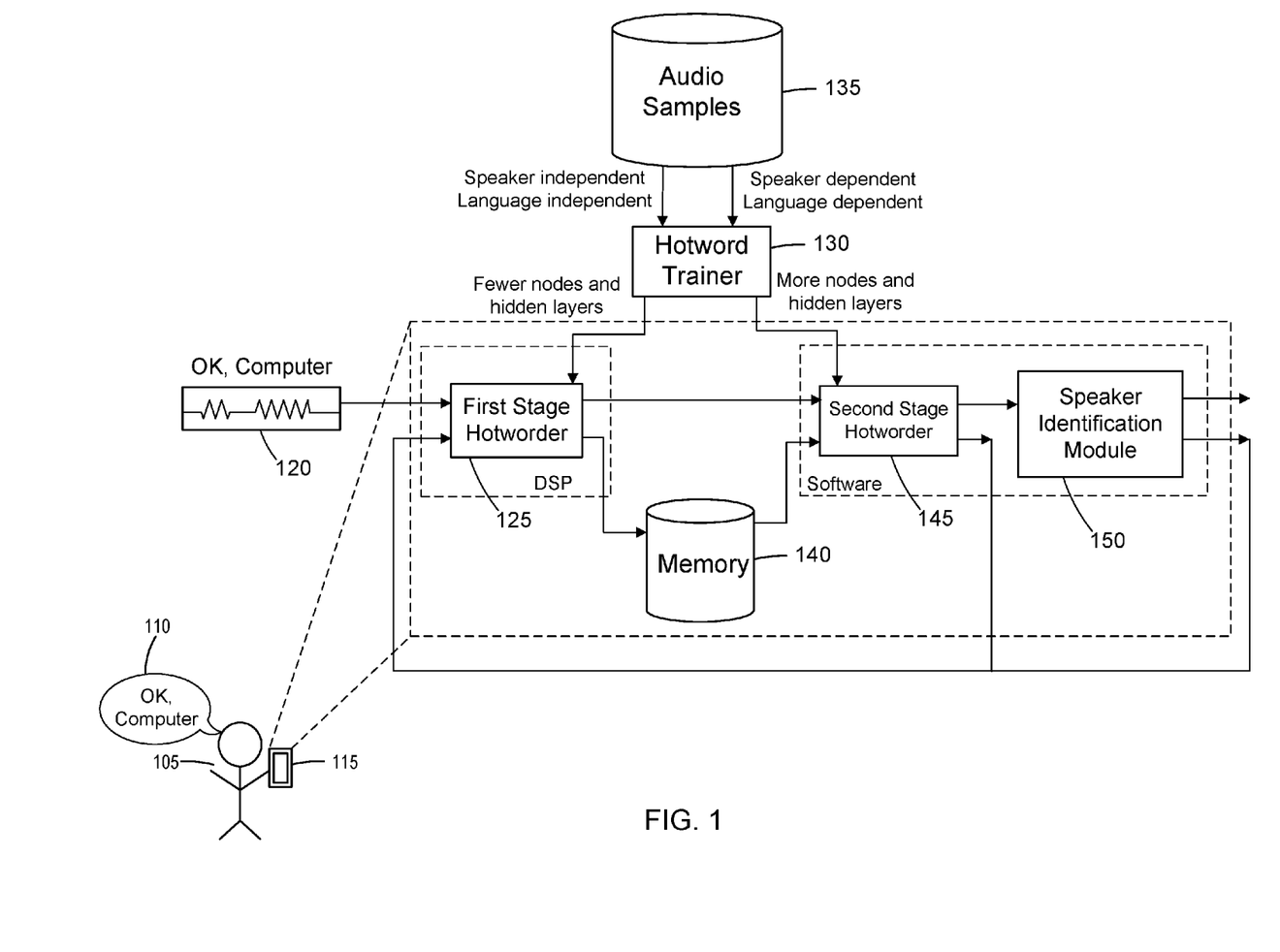
FIG. 1 is a diagram of an example system that is used for performing hotword detection.

FIG. 1 is a diagram of an example system 100 that is used for performing hotword detection. In general, system 100 illustrates a user 105 speaking an utterance 110 that is detected by the computing device 115. The computing device 115 processes the utterance 110 to determine a likelihood that the utterance 110 includes a hotword, as well as to determine a likelihood that the identity of the user 105 corresponds to a use previously identified by the computing device 115. To determine the likelihood that the utterance 110 includes a hotword, the computing device 115 uses a multi-state hotworder that includes both a low power stage that runs on a digital signal processor (DSP) and a higher power stage that is implemented in software.

In more detail, user 105 speaks the utterance 110, "OK computer," and the computing device 115 detects the utterance 110. The computing device 115 may be any device that is capable of receiving and processing speech such as a phone, a tablet, a laptop computer, a personal digital assistant, a desktop computer, a watch, a thermostat, or any other computing device. A microphone of the computing device 115 detects the utterance 110 and an audio subsystem of the computing device 115 processes the data corresponding to the utterance 110. The audio subsystem buffers, filters, and digitizes the data corresponding to the utterance 110 to create processed audio data 120. In some implementations, the computing device 115 performs endpointing on the utterance 110.

The audio subsystem of the computing device 115 provides the processed audio data 120 to a first stage of the hotworder. The first stage hotworder 125 may be a "coarse" hotworder. The first stage hotworder 125 performs a classification process that may be informed or trained using known utterances of the hotword, and computes a likelihood that the utterance 110 includes a hotword. In some implementations, the first stage hotworder 125 is implemented in a DSP. The first stage hotworder 125 may be ready to receive and process audio data anytime that the computing device 115 is on. Even though the first stage hotworder 125 is ready to receive and process audio data, because the first stage hotworder 125 is implemented in a DSP, the first stage hotworder 125 consumes little power.

To implement the first stage hotworder 125, a hotword trainer 130 may generate a neural network that is used to configure the DSP. The hotword trainer 130 receives audio samples from the audio sample storage 135 and produces data for generating neural networks. In some implementations, the hotword trainer 130 receives audio samples that correspond to utterances that include the hotword spoken by user 105. In this implementation, the hotword trainer 130 produces data for generating neural networks that are speaker dependent. In some implementations, the hotword trainer 130 receives audio samples that correspond to utterances that include the hotword spoken by users who have similar accents. In this implementation, the hotword trainer 130 produces data for generating neural networks that are language dependent and speaker independent. In some implementations, the hotword trainer 130 receives audio samples that correspond to utterances that include the hotword spoken by users who have different accents. In this implementation, the hotword trainer 130 produces data for generating neural networks that are language and speaker independent. In some implementations, the first stage hotworder 125 is implemented without neural networks. For example, the first stage hotworder 125 may be implemented using a hidden Markov model based technique.

The neural network that is used to configure the first stage hotworder 125 may be speaker dependent, speaker independent and language dependent, or speaker and language independent. Typically, the neural network that is used to configure the first stage hotworder 125 is speaker and language independent. The neural network may contain a particular number of nodes and hidden layers. The number of nodes and hidden layers should be selected such that the classification process performed by the first stage hotworder 125 is performed quickly. In the stage of the hotworder performed by the first stage hotworder 125, the quickness of the classification process of audio data 120 is more important than the accuracy. For example, the number of nodes and hidden layers may be selected so that if the user 105 speaks "hello," then the first stage hotworder 125 would consider that utterance to likely contain the hotword. The number of nodes and hidden layers should also be selected so that if a dog is barking, then the first stage hotworder 125 would consider that utterance to not likely contain the hotword. In other words, at this stage false acceptances are likely to occur and false rejections should not occur.

Based on the classification process performed by the first stage hotworder 125, the first stage hotworder 125 computes a hotword confidence score. If the hotword confidence score satisfies a threshold value, then the first stage hotworder 125 stores the audio data 120 into memory 140 of the computing device 115. In some implementations, if the hotword confidence score is greater than or equal to a threshold value, then the first stage hotworder 125 stores the audio data 120 into memory 140. For example, if the hotword confidence score is 0.7 and the threshold value is 0.5, then the first stage hotworder 125 stores the audio data 120 into memory 140.

The process of the first stage hotworder 125 performing the classification process on the audio data 125 is performed as the first stage hotworder 125 receives the audio data 120. The first stage hotworder 125 may only need to process an initial portion of the audio data 125 before the first stage hotworder 125 computes a hotword confidence score that satisfies a threshold. As an example, after receiving audio data corresponding to "OK com" the first stage hotworder 125 may compute a hotword confidence score of 0.5. With the hotword confidence score of 0.5 greater than or equal to the threshold value of 0.5, the first stage hotworder 125 stores the audio data into memory 140 and transmits a signal to the next stage of the hotworder, the second stage hotworder 145. The second stage hotworder 145 may be a "fine" hotworder.

In some implementations, the first stage hotworder 125 may begin to store the audio data 120 into memory 140 as the first stage hotworder 125 receives the audio data 120. In this implementation, the first stage hotworder 125 transmits a signal to the next stage of the hotworder, the second stage hotworder 145 if the first stage hotworder 125 computes a hotword confidence score that satisfies the threshold value. If the first stage hotworder 125 computes a hotword confidence score that does not satisfy the threshold value, then the first stage hotworder 125 ceases to store the audio data 120 into memory 140 and does not transmit a signal to the next stage of the hotworder.

Once the first stage hotworder 125 transmits a signal to the second stage hotworder 145 indicating that the utterance likely includes a hotword, the second stage hotworder 145 retrieves the audio data 120 from memory 140 and begins to process the audio data 120 that is stored in memory 140. In some implementations, then first stage hotworder 125 includes in the signal to the second stage hotworder 145 the location in memory 140 where first stage hotworder 125 stored the audio data 120. In some implementations, the first stage hotworder 125 stores the audio data 120 in a predetermined location in memory 140 that is known by the second stage hotworder 145.

To implement the second stage hotworder 145, a hotword trainer 130 may generate a neural network that is coded in software and run on a processor. The neural network may be based on the same audio samples as the neural network of the first stage hotworder 125 but with additional nodes and hidden layers. For example, the hotword trainer 130 received audio samples from the audio sample storage 135 that were speaker and language independent. The hotword trainer 130 produces data for generating neural networks that are speaker and language independent and provides the first stage hotworder 125 with a neural network with fewer nodes and hidden layers than the neural network provided to the second stage hotworder 145. In some implementations, the second stage hotworder 145 is implemented without neural networks. For example, the second stage hotworder 145 may be implemented using a hidden Markov model based technique.

In some implementations, the hotword trainer 130 receives audio samples that are speaker and language independent and produces data for generating neural networks that is speaker and language independent. The hotword trainer 130 generates a neural network for the first stage hotworder 125 that is speaker and language independent. The hotword trainer 130 uses audio samples that are speaker and language dependent and produces data for generating neural networks that is speaker and language dependent. The hotword trainer 130 generates a neural network for the second stage hotworder 145 that is speaker and language dependent.

The second stage hotworder 145 performs a classification process to determine a likelihood that the utterance 110 includes the hotword. The second stage hotworder 145 computes a hotword confidence score and compares the hotword confidence score to a threshold value. If the hotword confidence score satisfies a threshold value, then the second stage hotworder 145 transmits a signal to the first stage hotworder 125 to cease storing audio data 120 into memory 140. For example, if the second stage hotworder 145 computes, based on audio data 120 corresponding to "OK computer," a hotword confidence score of 0.7 that is greater than or equal to a threshold value of 0.7, then the second stage hotworder 145 transmits a signal to the first stage hotworder 125 to cease storing the audio data 120 into memory 140.

In some implementations, upon determining that the hotword confidence score satisfies a threshold value, the second stage hotworder 145 may provide the audio data to a speaker identification module 150. The speaker identification module 150 may be implemented in software that runs on a processor. The speaker identification module 150 analyzes the audio data 120 to calculate a speaker identity confidence score indicating a confidence that the identity of the speaker matches a particular user such as the user 105. If the speaker identity confidence score satisfies a threshold, then the speaker identification module 150 determines that the speaker is user 105.

In some implementations, the speaker identification module 150 transmits a signal to the second stage hotworder 145 or to the first stage hotworder 125 indicating that the speaker identity confidence score satisfies a threshold and to cease storing or forwarding of the audio data 120. For example, the second stage hotworder 145 determines that the utterance 110 likely includes the hotword "OK computer," and the second stage hotworder 145 transmits a signal to the first stage hotworder 125 instructing the first stage hotworder 125 to cease storing the audio data 125 into memory 140. The second stage hotworder 145 forwards the audio data 120 to the speaker identification module 150. Once the speaker identification module 150 determines that the identity of the speaker likely matches user 105, then the speaker identification module 150 transmits a signal to the second stage hotworder 145 to cease providing the speaker identification module 150 with audio data 120.

In some implementations, the speaker identification module 150 may require additional audio data to compute a speaker identify confidence score that the second stage hotworder 145 may not have received from the first stage hotworder 125. In this implementation, speaker identification module 150 may transmit a signal to the first stage hotworder 125 and to the second stage hotworder 125. The signal transmitted to the first stage hotworder 125 instructs the first stage hotworder 125 to store additional audio data 120 in memory 140. The signal transmitted to the second stage hotworder 145 instructs the second stage hotworder 145 to forward the additional audio data 120 that the second stage hotworder 145 retrieves from memory 140.

Figure 2:
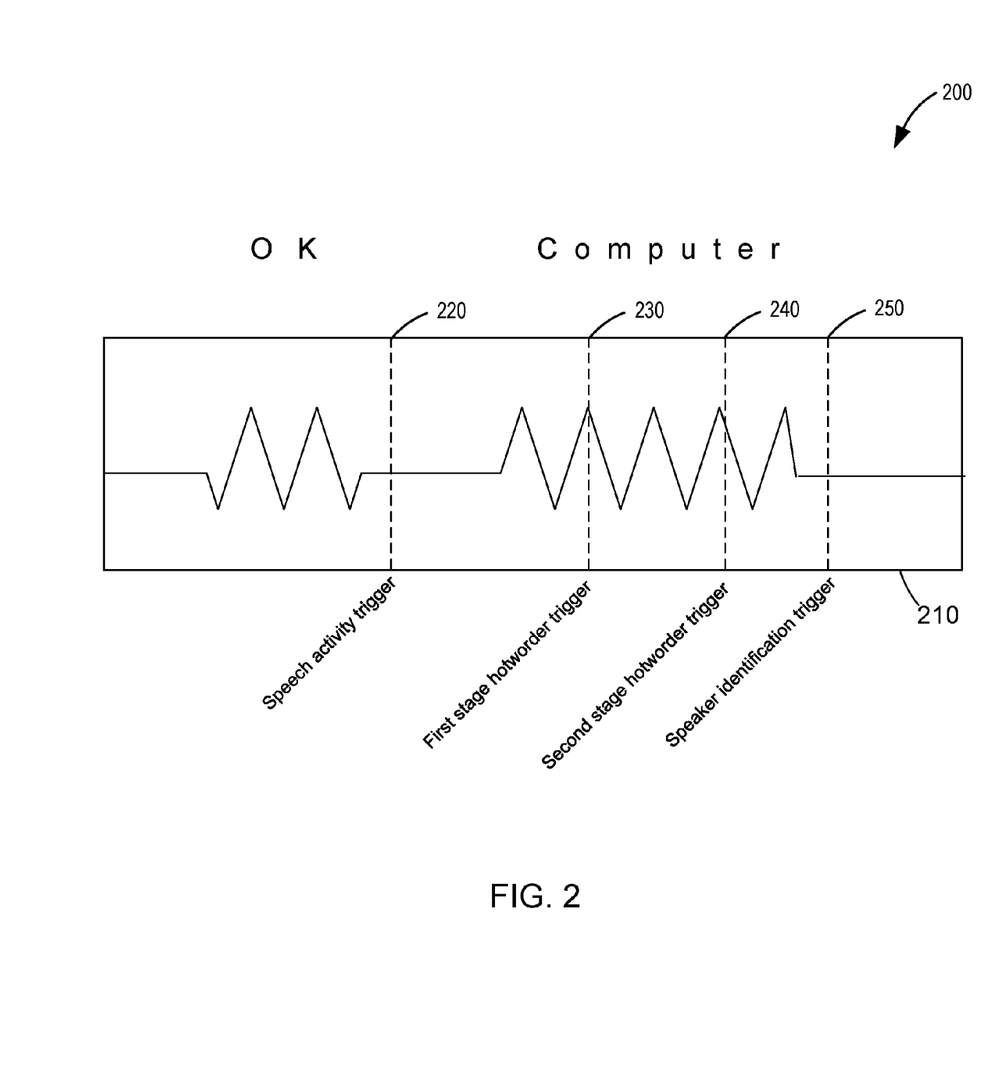
FIG. 2 is a timing diagram illustrating example trigger timing of different stages during hotword detection.

FIG. 2 is a timing diagram 200 illustrating example trigger timing of different stages during hotword detection. In general, the timing diagram 200 illustrates the timing of the triggers of the first stage hotworder, the second stage hotworder, and the speaker identification module when processing audio data that corresponds to an utterance. The triggers indicate the points where the first stage hotworder, the second stage hotworder, or the speaker identification module determine a likelihood that the utterance includes a hotword. The first stage hotworder, the second stage hotworder, and the speaker identification module may be included in a computing device such as the first stage hotworder 125, the second stage hotworder 145, and the speaker identification module 150 included in the computing device 115 from FIG. 1.

A user speaks an utterance that is detected by a computing device. The microphone of the computing device detects the utterance and provides data corresponding to the utterance to an audio subsystem of the computing device. The audio subsystem processes the utterance and provides audio data to the first stage of the hotworder, the first stage hotworder as the audio subsystem processes the utterance.

In some implementations, the computing device includes a speech detector. The speech detector receives the audio data 210 from the audio subsystem as the audio subsystem processes the audio data 210 and determines a likelihood that the audio data includes human speech. A short period, e.g. one hundred milliseconds, of audio data may be all that the speech detector requires to determine whether the audio data includes human speech. As illustrated with the speech activity trigger 220, the speech activity detector determines that the audio data included human speech after processing "OK." To determine the likelihood that the audio data includes human speech, the speech detector computes a human speech confidence score. If the human speech confidence score satisfies a threshold, then the audio data likely includes human speech and the speech detector provides the audio data to the first stage hotworder. In some implementations, the speech detector may always be active and processing audio data. When the audio data likely includes human speech the speech detector provides the audio data to the hotworder and a signal instructing the hotworder to determine whether the audio data includes a hotword.

The first stage hotworder receives audio data from either the speech detector or the audio subsystem as either the speech detector or the audio subsystem process the audio data 210. In instances where the first stage hotworder receives audio data from the speech detector, the first stage hotworder may not always be active, instead the first stage hotworder activates when the first stage hotworder receives a signal from the speech detector that the audio data includes human speech. For example, the first stage hotworder activates when the first stage hotworder receives the audio data preceding the speech activity trigger 220. As the first stage hotworder processes the audio data, the speech detector receives subsequent audio data and provides the subsequent audio data to the first stage hotworder. In instances where the first stage hotworder receives the audio data 210 from the audio subsystem, the first stage hotworder may be active and processing audio data as the audio subsystem provides the audio data.

The first stage hotworder receives the audio data and performs a classification process to determine whether the audio data likely includes a hotword. The classification process may use a neural network that is generated using data that is speaker and language independent. The first stage hotworder may only require a portion of the audio data 210, e.g., three hundred milliseconds, to determine a likelihood that the audio data 210 includes an utterance. As illustrated with the first stage hotworder trigger 230, the first stage hotworder determines that the audio data likely includes the hotword after processing "OK co." If the first stage hotworder determines that the audio data 210 likely includes the hotword, then the first stage hotworder provides the audio data 210 up to the first stage hotworder trigger 230 and subsequent audio data to the next stage of the hotworder, the second stage hotworder. If the first stage hotworder determines that the audio data 210 likely does not include the hotword, then the first stage hotworder ceases to process the audio data 210.

The second stage hotworder receives the audio data from first stage hotworder and performs a classification process to determine whether the audio data likely includes a hotword. The received audio data includes the audio data preceding the first stage hotworder trigger 230 and subsequently received audio data. The classification process may use a neural network that is generated using data that is speaker and language dependent. The second stage hotworder may only require a portion of the audio data 210, e.g., six hundred milliseconds, to determine a likelihood that the audio data 210 includes an utterance. As illustrated with the second stage hotworder trigger 240, the second stage hotworder determines that the audio data likely includes the hotword after processing "OK comput." If the second stage hotworder determines that the audio data 210 likely includes the hotword, then the second stage hotworder provides the audio data 210 up to the second stage hotworder trigger 240 and subsequent audio data to the speaker identification module. If the second stage hotworder determines that the audio data 210 likely does not include the hotword, then the second stage hotworder ceases to process the audio data 210 and does not provide the audio data to the speaker identification module.

The speaker identification module receives audio data from the second stage hotworder. The received audio data includes the audio data preceding the second stage hotworder trigger 240 and subsequently received audio data. The speaker identification module processes the received audio data to determine a likelihood that the speaker matches a particular user. The speaker identification module may only require a portion of the audio data 210, e.g., eight hundred milliseconds, to determine a likelihood that the speaker matches a particular user. As illustrated with speaker identification trigger 250, the speaker identification module determines that the speaker matches a particular user after processing "OK computer." If the speaker identification module determines that the speaker matches a particular user, then the computing device continues to perform speech recognition on any subsequently received speech. If the speaker identification module determines that the speaker does not match a particular user, then the computing device does not perform speech recognition on any subsequently received speech.

Figure 3:
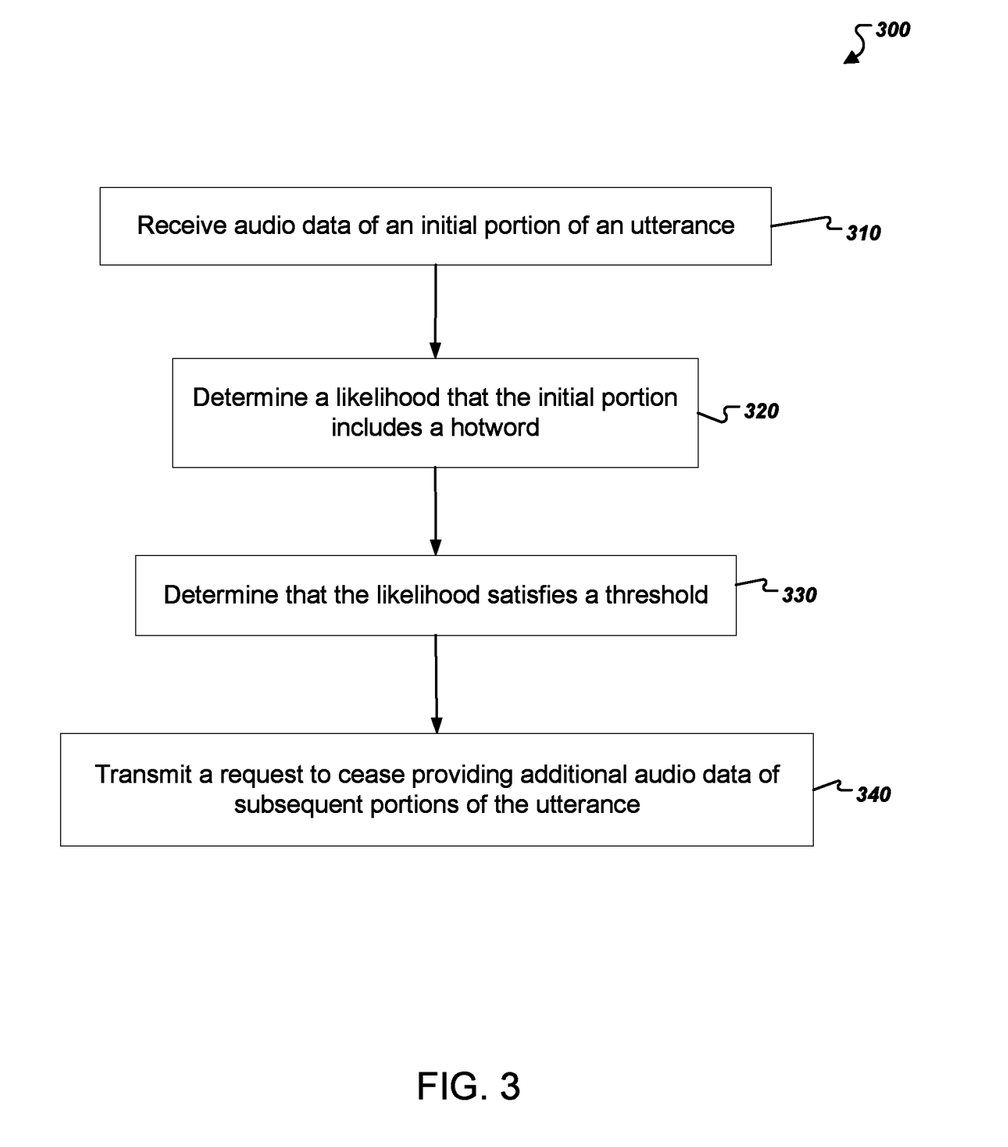
FIG. 3 is a diagram of an example process for hotword detection.

FIG. 3 is a diagram of an example process for hotword detection. The process 300 may be performed by a computing device such as the computing device 115 from FIG. 1. The process 300 computes a likelihood that an utterance includes a hotword using a multi-stage hotworder. During process 300 the later stages of the multi-stage hotworder communicate to the earlier stages whether the later stages require additional audio data to compute a likelihood that an utterance includes a hotword.

The computing device receives, by a second stage hotword detector of a multi-stage hotword detection system that includes at least a first stage hotword detector and the second stage hotword detector, audio data that corresponds to an initial portion of an utterance (310). At the point when the second stage hotword detector receives the audio data, a user may be in the middle of speaking the utterance. For example, if the utterance is "OK computer," then the initial portion may correspond to "OK comput." In some implementations, the audio data includes additional audio data that was received by the computing device before the utterance. For example, the audio data received by the second stage may correspond to two seconds of audio. If the initial portion of the utterance corresponds to eight hundred milliseconds of audio, then the audio data received by the second stage includes an additional 1.2 seconds of audio data that the computing device received before the utterance.

In some implementations, the first stage hotword detector is implemented in a DSP and the second stage hotword detector is implemented in software running on a processor. Configuring the hotword detector in this fashion allows the first stage to be a low power stage that provide a rough approximation as to whether the audio data includes a hotword. The low power consumption of the first stage allows the first stage to remain active and ready to process any incoming audio data without significantly draining the battery. Implementing the second stage in software allows for a more accurate hotword detector that can be activated when the first stage triggers. The software of the second stage can also be updated with a software update.

In some implementations, the second stage hotword detector retrieves the audio data that corresponds to the initial portion of the utterance from a particular location in memory. The first stage receives and processes the audio data that corresponds to the initial portion of the utterance. If the first stage determines that the likelihood that the initial portion of the utterance satisfies an initial threshold, then the first stage stores the audio data in a location in memory where the second stage hotword detector knows to retrieve the audio data and sends a notification to the second stage that the audio data satisfied the initial threshold. For example, the first stage may store the audio data at location 0x7fff0815c0e8 of memory each time the first stage determines that the audio data that corresponds to the initial portion of the utterance includes the hotword, and the second stage retrieves the audio data from that same location once the first stage notifies the second stage.

In some implementations, the first stage hotword detector implements a neural network that includes a particular number of nodes and hidden layers. The second stage hotword detector implements a neural network that includes more nodes and hidden layers. The additional nodes and layers allow the second stage to be more accurate, but at a performance cost. The first stage determines a likelihood that the audio data that corresponds to the initial portion of the utterance includes a hotword faster and with less audio data than the second stage. The second stage may require additional audio data and additional time to make a hotword determination.

In some implementations, the first stage is speaker and language independent. The first stage may be programmed using a neural network that was generated using audio samples that included the hotword and were spoken by different speakers who had a variety of accents. In some implementations, the second stage is speaker and language dependent. The second stage may be programmed using a neural network that was generated using audio samples that included the hotword and were spoken by the same speaker.

The computing device determines, by the second stage hotword detector, a likelihood that the initial portion of the utterance includes a hotword (320). The likelihood is typically indicated by a hotword confidence score that is between zero and one. The closer the hotword confidence score is to one, the greater the likelihood that the utterance includes a hotword. The computing device determines, by the second stage hotword detector, that the likelihood that the initial portion of the utterance includes the hotword satisfies a threshold (330). When the hotword confidence score satisfies a threshold, the computing device determines that the utterance likely includes the hotword. In some implementations, the hotword confidence score satisfies a threshold by being greater than or equal to the threshold.

In response to determining that the likelihood satisfies the threshold, the computing device transmits, by the second stage hotword detector and to the first stage hotword detector, a request for the first stage hotword detector to cease providing additional audio data that corresponds to one or more subsequent portions of the utterance (340). When the first stage provided the second stage with the audio data that corresponds to an initial portion of an utterance, the speaker had not finished speaking the utterance. As the user continues to speak, the first stage provided audio data that corresponds to the additional portions of the utterance. Once the second stage determines that the utterance likely includes the hotword, the second stage sends a request to the first stage to stop providing the additional audio data. In some implementations, the first stage ceases to provide the additional audio data to memory for retrieval by the second stage. In some implementations, the first stage ceases to provide the additional audio directly to the second stage. In some implementations, the second stage provides the audio data that corresponds to an initial portion of an utterance and the additional audio data to a speaker identifier. The second stage may provide the audio data and the additional audio data when the hotword confidence score satisfies the threshold. The speaker identifier processes the audio data and the additional audio data to determine whether the identity of the speaker matches a particular user.

Figure 4:
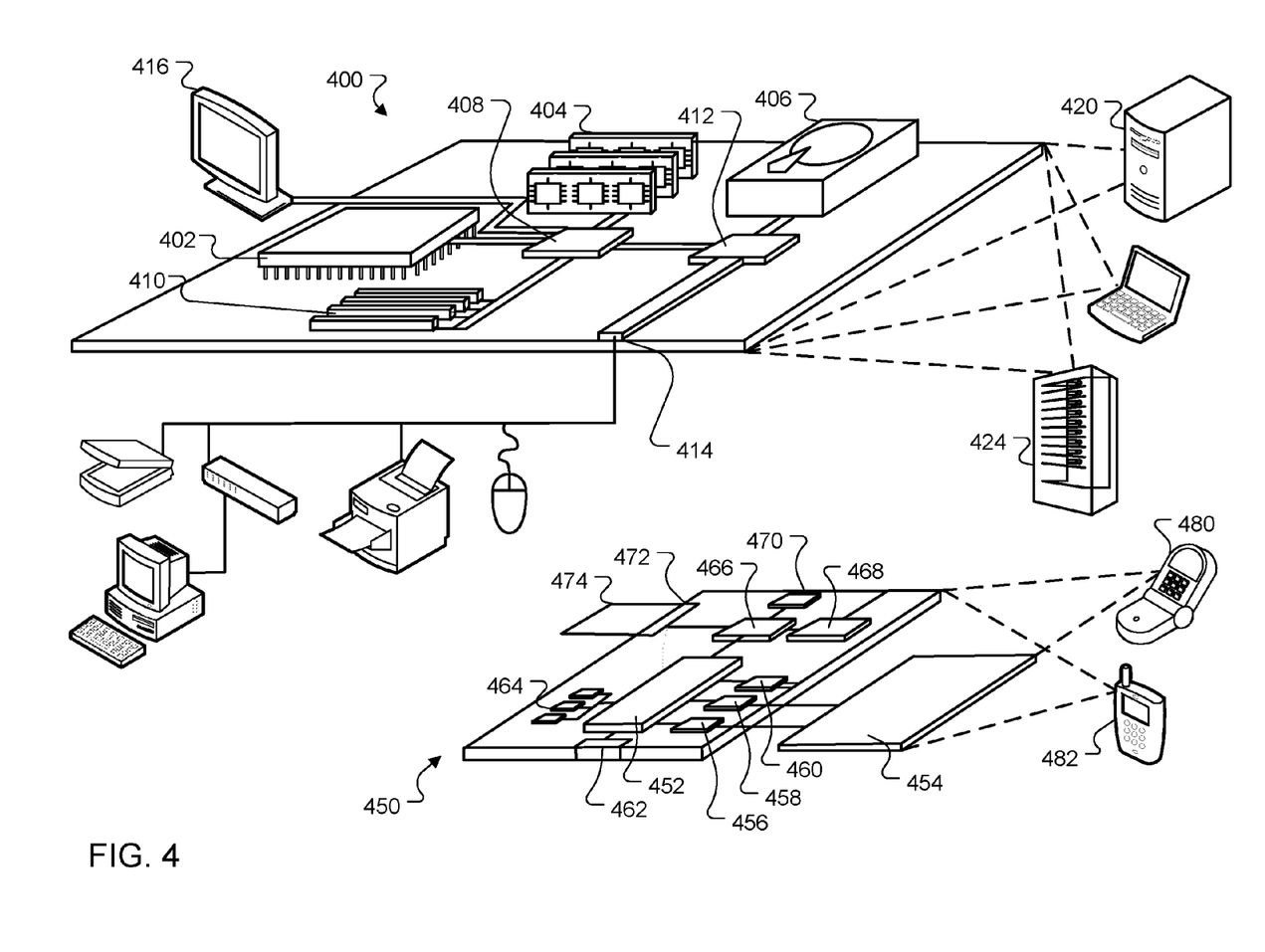
FIG. 4 shows an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
 receiving, by a first stage hotword detector of a multi-stage hotword detection system that includes at least (i) the first stage hotword detector that is implemented in hardware and that is associated with a memory, and (ii)

a second stage hotword detector that is implemented in software and that is configured to output a signal indicating whether a given utterance likely includes a hotword, audio data that corresponds to an initial portion of an utterance;

providing, by the first stage hotword detector that is implemented in hardware and to the second stage hotword detector that is implemented in software, and based on the first stage hotword detector determining that the initial portion of the utterance likely includes the hotword, data indicating an instruction to access the audio data that corresponds to the initial portion of the utterance and that is stored in the memory associated with the first stage hotword detector;

receiving, by the first stage hotword detector that is implemented in hardware and from the second stage hotword detector that is implemented in software, audio data that corresponds to a subsequent portion of the utterance;

receiving, from the second stage hotword detector that is implemented in software and by the first stage hotword detector that is implemented in hardware and based on the second stage hotword detector determining that the initial portion of the utterance likely includes the hotword, data indicating an instruction to cease providing, to the memory associated with the first stage hotword detector, audio data that corresponds to one or more subsequent portions of the utterance; and in response to receiving, from the second stage hotword detector that is implemented in software and by the first stage hotword detector that is implemented in hardware and based on the second stage hotword detector determining that the initial portion of the utterance likely includes the hotword, the data indicating the instruction to cease providing, to the memory associated with the first stage hotword detector, the audio data that corresponds to the one or more subsequent portions of the utterance, providing, for output by the multi-stage hotword detection system, a signal indicating that the utterance likely includes the hotword.

2. The method of claim 1, wherein the first stage hotword detector is implemented in a digital signal processor.

3. The method of claim 1, wherein providing, by the first stage hotword detector that is implemented in hardware and to the second stage hotword detector that is implemented in software, data indicating an instruction to access the audio data that corresponds to the initial portion of the utterance and that is stored in the memory associated with the first stage hotword detector comprises:

providing, by the first stage hotword detector that is implemented in hardware and to the second stage hotword detector that is implemented in software, data that indicates an address of the memory.

4. The method of claim 1, comprising:

receiving data that corresponds a first number of nodes and a second number of hidden layers for a neural network, wherein the second stage hotword detector receives data that corresponds to a third number of nodes and a fourth number of hidden layers for the neural network, the third number being greater than the first number and the fourth number being greater than the second number.

5. The method of claim 1, comprising:

before receiving, from the second stage hotword detector that is implemented in software and by the first stage hotword detector that is implemented in hardware and based on the second stage hotword detector determining that the initial portion of the utterance likely includes the hotword, data indicating an instruction to cease providing, to the memory associated with the first stage hotword detector, audio data that corresponds to one or more subsequent portions of the utterance, providing, to the memory associated with the first stage hotword detector, the audio data that corresponds to the subsequent portion of the utterance.

6. The method of claim 1, comprising:

in response to receiving, from the second stage hotword detector that is implemented in software and by the first stage hotword detector that is implemented in hardware and based on the second stage hotword detector determining that the initial portion of the utterance likely includes the hotword, data indicating an instruction to cease providing, to the memory associated with the first stage hotword detector, audio data that corresponds to one or more subsequent portions of the utterance and after receiving the audio data that corresponds to the subsequent portion of the utterance, not providing, to the memory associated with the first stage hotword detector, the audio data that corresponds to the subsequent portion of the utterance.

7. The method of claim 1, comprising:

after receiving, from the second stage hotword detector that is implemented in software and by the first stage hotword detector that is implemented in hardware and based on the second stage hotword detector determining that the initial portion of the utterance likely includes the hotword, data indicating an instruction to cease providing, to the memory associated with the first stage hotword detector, audio data that corresponds to one or more subsequent portions of the utterance, providing, to the memory associated with the first stage hotword detector, the audio data that corresponds to the subsequent portion of the utterance;

receiving audio data that corresponds to an additional subsequent portion of the utterance; and receiving, from a speaker identification module and by the first stage hotword detector, data indicating the instruction to cease providing, to the memory associated with the first stage hotword detector, audio data that corresponds to one or more subsequent portions of the utterance.

8. The method of claim 1, wherein:

the first stage hotword detector is included in a computing device, and the first stage hotword detector is active based on the computing device being active.

9. A system comprising:

one or more computers and one or more storage devices storing instructions that are operable, when executed by the one or more computers, to cause the one or more computers to perform operations comprising:

receiving, by a first stage hotword detector of a multi-stage hotword detection system that includes at least (i) the first stage hotword detector that is implemented in hardware and that is associated with a memory, and (ii) a second stage hotword detector that is implemented in software and that is configured to output a signal indicating whether a given utterance likely includes a hotword, audio data that corresponds to an initial portion of an utterance;

providing, by the first stage hotword detector that is implemented in hardware and to the second stage hotword detector that is implemented in software, and based on the first stage hotword detector determining that the initial portion of the utterance likely includes the hotword, data indicating an instruction to access the audio data that corresponds to the initial portion of the utterance and that is stored in the memory associated with the first stage hotword detector;

receiving, by the first stage hotword detector that is implemented in hardware and from the second stage hotword detector that is implemented in software, audio data that corresponds to a subsequent portion of the utterance;

receiving, from the second stage hotword detector that is implemented in software and by the first stage hotword detector that is implemented in hardware and based on the second stage hotword detector determining that the initial portion of the utterance likely includes the hotword, data indicating an instruction to cease providing, to the memory associated with the first stage hotword detector, audio data that corresponds to one or more subsequent portions of the utterance; and in response to receiving, from the second stage hotword detector that is implemented in software and by the first stage hotword detector that is implemented in hardware and based on the second stage hotword detector determining that the initial portion of the utterance likely includes the hotword, the data indicating the instruction to cease providing, to the memory associated with the first stage hotword detector, the audio data that corresponds to the one or more subsequent portions of the utterance, providing, for output by the multi-stage hotword detection system, a signal indicating that the utterance likely includes the hotword.

10. The system of claim 9, wherein the first stage hotword detector is implemented in a digital signal processor.

11. The system of claim 9, wherein providing, by the first stage hotword detector that is implemented in hardware and to the second stage hotword detector that is implemented in software, data indicating an instruction to access the audio data that corresponds to the initial portion of the utterance and that is stored in the memory associated with the first stage hotword detector comprises:

providing, by the first stage hotword detector that is implemented in hardware and to the second stage hotword detector that is implemented in software, data that indicates an address of the memory.

12. The system of claim 9, wherein the operations further comprise:

receiving data that corresponds a first number of nodes and a second number of hidden layers for a neural network, wherein the second stage hotword detector receives data that corresponds to a third number of nodes and a fourth number of hidden layers for the neural network, the third number being greater than the first number and the fourth number being greater than the second number.

13. The system of claim 9, wherein the operations further comprise:

before receiving, from the second stage hotword detector that is implemented in software and by the first stage hotword detector that is implemented in hardware and based on the second stage hotword detector determining that the initial portion of the utterance likely includes the hotword, data indicating an instruction to cease providing, to the memory associated with the first stage hotword detector, audio data that corresponds to one or more subsequent portions of the utterance, providing, to the memory associated with the first stage hotword detector, the audio data that corresponds to the subsequent portion of the utterance.

14. The system of claim 9, wherein the operations further comprise:

in response to receiving, from the second stage hotword detector that is implemented in software and by the first stage hotword detector that is implemented in hardware and based on the second stage hotword detector determining that the initial portion of the utterance likely includes the hotword, data indicating an instruction to cease providing, to the memory associated with the first stage hotword detector, audio data that corresponds to one or more subsequent portions of the utterance and after receiving the audio data that corresponds to the subsequent portion of the utterance, not providing, to the memory associated with the first stage hotword detector, the audio data that corresponds to the subsequent portion of the utterance.

15. The system of claim 9, wherein the operations further comprise:

after receiving, from the second stage hotword detector that is implemented in software and by the first stage hotword detector that is implemented in hardware and based on the second stage hotword detector determining that the initial portion of the utterance likely includes the hotword, data indicating an instruction to cease providing, to the memory associated with the first stage hotword detector, audio data that corresponds to one or more subsequent portions of the utterance, providing, to the memory associated with the first stage hotword detector, the audio data that corresponds to the subsequent portion of the utterance;

receiving audio data that corresponds to an additional subsequent portion of the utterance; and receiving, from a speaker identification module and by the first stage hotword detector, data indicating the instruction to cease providing, to the memory associated with the first stage hotword detector, audio data that corresponds to one or more subsequent portions of the utterance.

16. The system of claim 9, wherein:

the first stage hotword detector is included in a computing device, and the first stage hotword detector is active based on the computing device being active.

17. A non-transitory computer-readable medium storing software comprising instructions executable by one or more computers which, upon such execution, cause the one or more computers to perform operations comprising:

receiving, by a first stage hotword detector of a multi-stage hotword detection system that includes at least (i) the first stage hotword detector that is implemented in hardware and that is associated with a memory, and (ii) a second stage hotword detector that is implemented in software and that is configured to output a signal indicating whether a given utterance likely includes a hotword, audio data that corresponds to an initial portion of an utterance;

providing, by the first stage hotword detector that is implemented in hardware and to the second stage hotword detector that is implemented in software, and based on the first stage hotword detector determining that the initial portion of the utterance likely includes the hotword, data indicating an instruction to access the audio data that corresponds to the initial portion of the utterance and that is stored in the memory associated with the first stage hotword detector;

receiving, by the first stage hotword detector that is implemented in hardware and from the second stage hotword detector that is implemented in software, audio data that corresponds to a subsequent portion of the utterance;

receiving, from the second stage hotword detector that is implemented in software and by the first stage hotword detector that is implemented in hardware and based on the second stage hotword detector determining that the initial portion of the utterance likely includes the hotword, data indicating an instruction to cease providing, to the memory associated with the first stage hotword detector, audio data that corresponds to one or more subsequent portions of the utterance; and in response to receiving, from the second stage hotword detector that is implemented in software and by the first stage hotword detector that is implemented in hardware and based on the second stage hotword detector determining that the initial portion of the utterance likely includes the hotword, the data indicating the instruction to cease providing, to the memory associated with the first stage hotword detector, the audio data that corresponds to the one or more subsequent portions of the utterance, providing, for output by the multi-stage hotword detection system, a signal indicating that the utterance likely includes the hotword.

18. The medium of claim 17, wherein the operations further comprise:

before receiving, from the second stage hotword detector that is implemented in software and by the first stage hotword detector that is implemented in hardware and based on the second stage hotword detector determining that the initial portion of the utterance likely includes the hotword, data indicating an instruction to cease providing, to the memory associated with the first stage hotword detector, audio data that corresponds to one or more subsequent portions of the utterance, providing, to the memory associated with the first stage hotword detector, the audio data that corresponds to the subsequent portion of the utterance.

19. The medium of claim 17, wherein the operations further comprise:

in response to receiving, from the second stage hotword detector that is implemented in software and by the first stage hotword detector that is implemented in hardware and based on the second stage hotword detector determining that the initial portion of the utterance likely includes the hotword, data indicating an instruction to cease providing, to the memory associated with the first stage hotword detector, audio data that corresponds to one or more subsequent portions of the utterance and after receiving the audio data that corresponds to the subsequent portion of the utterance, not providing, to the memory associated with the first stage hotword detector, the audio data that corresponds to the subsequent portion of the utterance.

20. The medium of claim 17, wherein the operations further comprise:

after receiving, from the second stage hotword detector that is implemented in software and by the first stage hotword detector that is implemented in hardware and based on the second stage hotword detector determining that the initial portion of the utterance likely includes the hotword, data indicating an instruction to cease providing, to the memory associated with the first stage hotword detector, audio data that corresponds to one or more subsequent portions of the utterance, providing, to the memory associated with the first stage hotword detector, the audio data that corresponds to the subsequent portion of the utterance;

receiving audio data that corresponds to an additional subsequent portion of the utterance; and receiving, from a speaker identification module and by the first stage hotword detector, data indicating the instruction to cease providing, to the memory associated with the first stage hotword detector, audio data that corresponds to one or more subsequent portions of the utterance.

* * * * *